(12) United States Patent
Shemer et al.

(10) Patent No.: US 9,411,535 B1
(45) Date of Patent: Aug. 9, 2016

(54) ACCESSING MULTIPLE VIRTUAL DEVICES

(71) Applicant: EMC Corporation, Hopkinton, MA (US)

(72) Inventors: Jehuda Shemer, Kfar Saba (IL); Saar Cohen, Moshav Mishmeret (IL); Assaf Natanzon, Tel Aviv (IL); Alex Solan, Hertzliya (IL); Ron Cooper, Tel Aviv (IL); Leehod Baruch, Rishon Leziyon (IL)

(73) Assignee: EMC CORPORATION, Hopkinton, MA (US)

( * ) Notice: Subject to any disclaimer, the term of this patent is extended or adjusted under 35 U.S.C. 154(b) by 0 days.

(21) Appl. No.: 14/670,909

(22) Filed: Mar. 27, 2015

(51) Int. Cl.
*G06F 13/12* (2006.01)
*G06F 3/06* (2006.01)

(52) U.S. Cl.
CPC .............. *G06F 3/0655* (2013.01); *G06F 3/067* (2013.01); *G06F 3/0608* (2013.01)

(58) Field of Classification Search
CPC ............................. G06F 21/575; G06F 3/0605
USPC ............................................ 710/74; 709/217
See application file for complete search history.

(56) References Cited

U.S. PATENT DOCUMENTS

| | | | |
|---|---|---|---|
| 5,170,480 A | 12/1992 | Mohan et al. | |
| 5,249,053 A | 9/1993 | Jain | |
| 5,388,254 A | 2/1995 | Betz et al. | |
| 5,499,367 A | 3/1996 | Bamford et al. | |
| 5,526,397 A | 6/1996 | Lohman | |
| 5,864,837 A | 1/1999 | Maimone | |
| 5,879,459 A | 3/1999 | Gadgil et al. | |
| 5,990,899 A | 11/1999 | Whitten | |
| 6,042,652 A | 3/2000 | Hyun et al. | |
| 6,065,018 A | 5/2000 | Beier et al. | |
| 6,143,659 A | 11/2000 | Leem | |
| 6,148,340 A | 11/2000 | Bittinger et al. | |
| 6,174,377 B1 | 1/2001 | Doering et al. | |
| 6,174,809 B1 | 1/2001 | Kang et al. | |
| 6,203,613 B1 | 3/2001 | Gates et al. | |
| 6,260,125 B1 | 7/2001 | McDowell | |
| 6,270,572 B1 | 8/2001 | Kim et al. | |
| 6,272,534 B1 | 8/2001 | Guha | |
| 6,287,965 B1 | 9/2001 | Kang et al. | |
| 6,467,023 B1 | 10/2002 | DeKoning et al. | |
| 6,574,657 B1 | 6/2003 | Dickinson | |
| 6,621,493 B1 | 9/2003 | Whitten | |
| 6,804,676 B1 | 10/2004 | Bains, II | |

(Continued)

FOREIGN PATENT DOCUMENTS

| | | |
|---|---|---|
| EP | 1154356 | 11/2001 |
| WO | WO 00 45581 A3 | 8/2000 |

OTHER PUBLICATIONS

Gibson, "Five Point Plan Lies at the Heart of Compression Technology;" Apr. 29, 1991; 1 Page.

(Continued)

*Primary Examiner* — Titus Wong
(74) *Attorney, Agent, or Firm* — Daly, Crowley, Mofford & Durkee, LLP

(57) ABSTRACT

In one aspect, a method includes receiving a first I/O at a kernel interface using a pseudo data storage system, writing the first I/O to a first virtual device on a datastore, receiving a second I/O at the kernel interface using the pseudo data storage system and writing the second I/O to a second virtual device on the datastore.

10 Claims, 8 Drawing Sheets

(56) References Cited

U.S. PATENT DOCUMENTS

| | | | |
|---|---|---|---|
| 6,947,981 B2 | 9/2005 | Lubbers et al. |
| 7,043,610 B2 | 5/2006 | Horn et al. |
| 7,051,126 B1 | 5/2006 | Franklin |
| 7,076,620 B2 | 7/2006 | Takeda et al. |
| 7,111,197 B2 | 9/2006 | Kingsbury et al. |
| 7,117,327 B2 | 10/2006 | Hirakawa et al. |
| 7,120,768 B2 | 10/2006 | Mizuno et al. |
| 7,130,975 B2 | 10/2006 | Suishu et al. |
| 7,139,927 B2 | 11/2006 | Park et al. |
| 7,159,088 B2 | 1/2007 | Hirakawa et al. |
| 7,167,963 B2 | 1/2007 | Hirakawa et al. |
| 7,203,741 B2 | 4/2007 | Marco et al. |
| 7,222,136 B1 | 5/2007 | Brown et al. |
| 7,296,008 B2 | 11/2007 | Passerini et al. |
| 7,328,373 B2 | 2/2008 | Kawamura et al. |
| 7,353,335 B2 | 4/2008 | Kawamura |
| 7,360,113 B2 | 4/2008 | Anderson et al. |
| 7,426,618 B2 | 9/2008 | Vu et al. |
| 7,516,287 B2 | 4/2009 | Ahal et al. |
| 7,519,625 B2 | 4/2009 | Honami et al. |
| 7,519,628 B1 | 4/2009 | Leverett |
| 7,546,485 B2 | 6/2009 | Cochran et al. |
| 7,577,867 B2 | 8/2009 | Lewin et al. |
| 7,590,887 B2 | 9/2009 | Kano |
| 7,603,533 B1 * | 10/2009 | Tsypliaev | G06F 21/575 709/217 |
| 7,606,940 B2 | 10/2009 | Yamagami |
| 7,627,612 B2 | 12/2009 | Ahal et al. |
| 7,627,687 B2 | 12/2009 | Ahal et al. |
| 7,719,443 B1 | 5/2010 | Natanzon |
| 7,757,057 B2 | 7/2010 | Sangapu et al. |
| 7,769,931 B1 * | 8/2010 | Angelone | G06F 3/0605 707/609 |
| 7,774,565 B2 | 8/2010 | Lewin et al. |
| 7,784,049 B1 * | 8/2010 | Gandler | G06F 9/455 709/211 |
| 7,797,358 B1 | 9/2010 | Ahal et al. |
| 7,840,536 B1 | 11/2010 | Ahal et al. |
| 7,840,662 B1 | 11/2010 | Natanzon |
| 7,844,856 B1 | 11/2010 | Ahal et al. |
| 7,849,361 B2 | 12/2010 | Ahal et al. |
| 7,860,836 B1 | 12/2010 | Natanzon et al. |
| 7,882,286 B1 | 2/2011 | Natanzon et al. |
| 7,934,262 B1 | 4/2011 | Natanzon et al. |
| 7,953,948 B1 * | 5/2011 | Dyatlov | G06F 11/1435 709/217 |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,205,009 B2 | 6/2012 | Heller et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |

(56) References Cited

U.S. PATENT DOCUMENTS

| | | |
|---|---|---|
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 2002/0129168 A1 | 9/2002 | Kanai et al. |
| 2003/0048842 A1 | 3/2003 | Fourquin et al. |
| 2003/0061537 A1 | 3/2003 | Cha et al. |
| 2003/0110278 A1 | 6/2003 | Anderson |
| 2003/0145317 A1 | 7/2003 | Chamberlain |
| 2003/0196147 A1 | 10/2003 | Hirata et al. |
| 2004/0205092 A1 | 10/2004 | Longo et al. |
| 2004/0250032 A1 | 12/2004 | Ji et al. |
| 2004/0254964 A1 | 12/2004 | Kodama et al. |
| 2005/0015663 A1 | 1/2005 | Armangau et al. |
| 2005/0028022 A1 | 2/2005 | Amano |
| 2005/0049924 A1 | 3/2005 | DeBettencourt et al. |
| 2005/0172092 A1 | 8/2005 | Lam et al. |
| 2005/0273655 A1 | 12/2005 | Chow et al. |
| 2006/0031647 A1 | 2/2006 | Hirakawa et al. |
| 2006/0047996 A1 | 3/2006 | Anderson et al. |
| 2006/0064416 A1 | 3/2006 | Sim-Tang |
| 2006/0107007 A1 | 5/2006 | Hirakawa et al. |
| 2006/0117211 A1 | 6/2006 | Matsunami et al. |
| 2006/0161810 A1 | 7/2006 | Bao |
| 2006/0179343 A1 | 8/2006 | Kitamura |
| 2006/0195670 A1 | 8/2006 | Iwamura et al. |
| 2006/0212462 A1 | 9/2006 | Heller et al. |
| 2007/0055833 A1 | 3/2007 | Vu et al. |
| 2007/0162513 A1 | 7/2007 | Lewin et al. |
| 2007/0180304 A1 | 8/2007 | Kano |
| 2007/0198602 A1 | 8/2007 | Ngo et al. |
| 2007/0198791 A1 | 8/2007 | Iwamura et al. |
| 2007/0220311 A1 | 9/2007 | Lewin et al. |
| 2007/0266053 A1 | 11/2007 | Ahal et al. |
| 2008/0082591 A1 | 4/2008 | Ahal et al. |
| 2008/0082592 A1 | 4/2008 | Ahal et al. |
| 2008/0082770 A1 | 4/2008 | Ahal et al. |
| 2014/0201157 A1* | 7/2014 | Pawar ............... G06F 17/30289 707/654 |

OTHER PUBLICATIONS

Soules, "Metadata Efficiency in Versioning File Systems;" 2003; 16 Pages.

AIX System Management Concepts: Operating Systems and Devices; May 2000; 280 Pages.

Soules et al.; "Metadata Efficiency in a Comprehensive Versioning File System;" May 2002; CMU-CS-02-145; School of Computer Science, Carnegie Mellon University, Pittsburgh, PA 15213; 33 Pages.

Linux Filesystems; Sams Publishing; 2002; 12 Pages.

Bunyan, "Multiplexing in a BrightStor® ARCserve® Backup Release 11;" Mar. 2004; 4 Pages.

Marks, "Network Computing;" Feb. 2, 2006; 8 Pages.

Hill, "Network Computing;" Jun. 8, 2006; 9 Pages.

Microsoft Computer Dictionary; 2002; Press Fifth Edition; 3 Pages.

Retrieved from http://en.wikipedia.org/wiki/DEFLATE; Deflate; Jun. 19, 2008; 6 Pages.

Retrieved from http://en.wikipedia.org/wiki/Huffman_coding; Huffman Coding; Jun. 8, 2008; 11 Pages.

Retrieved from http:///en.wikipedia.org/wiki/LZ77; LZ77 and LZ78; Jun. 17, 2008; 2 Pages.

U.S. Appl. No. 11/609,560 downloaded Feb. 23, 2015; 265 Pages.
U.S. Appl. No. 12/057,652 downloaded Feb. 23, 2015; 296 Pages.
U.S. Appl. No. 11/609,561 downloaded Feb. 23, 2015; 219 Pages.
U.S. Appl. No. 11/356,920 downloaded Feb. 23, 2015; 272 Pages.
U.S. Appl. No. 10/512,687 downloaded Feb. 23, 2015; 300 Pages.
U.S. Appl. No. 10/512,687 downloaded Feb. 23, 2015; 254 Pages.
U.S. Appl. No. 11/536,233 downloaded Feb. 23, 2015; 256 Pages.
U.S. Appl. No. 11/536,215 downloaded Feb. 23, 2015; 172 Pages.
U.S. Appl. No. 11/536,160 downloaded Feb. 23, 2015; 230 Pages.
U.S. Appl. No. 11/964,168 downloaded Feb. 23, 2015; 222 Pages.

* cited by examiner

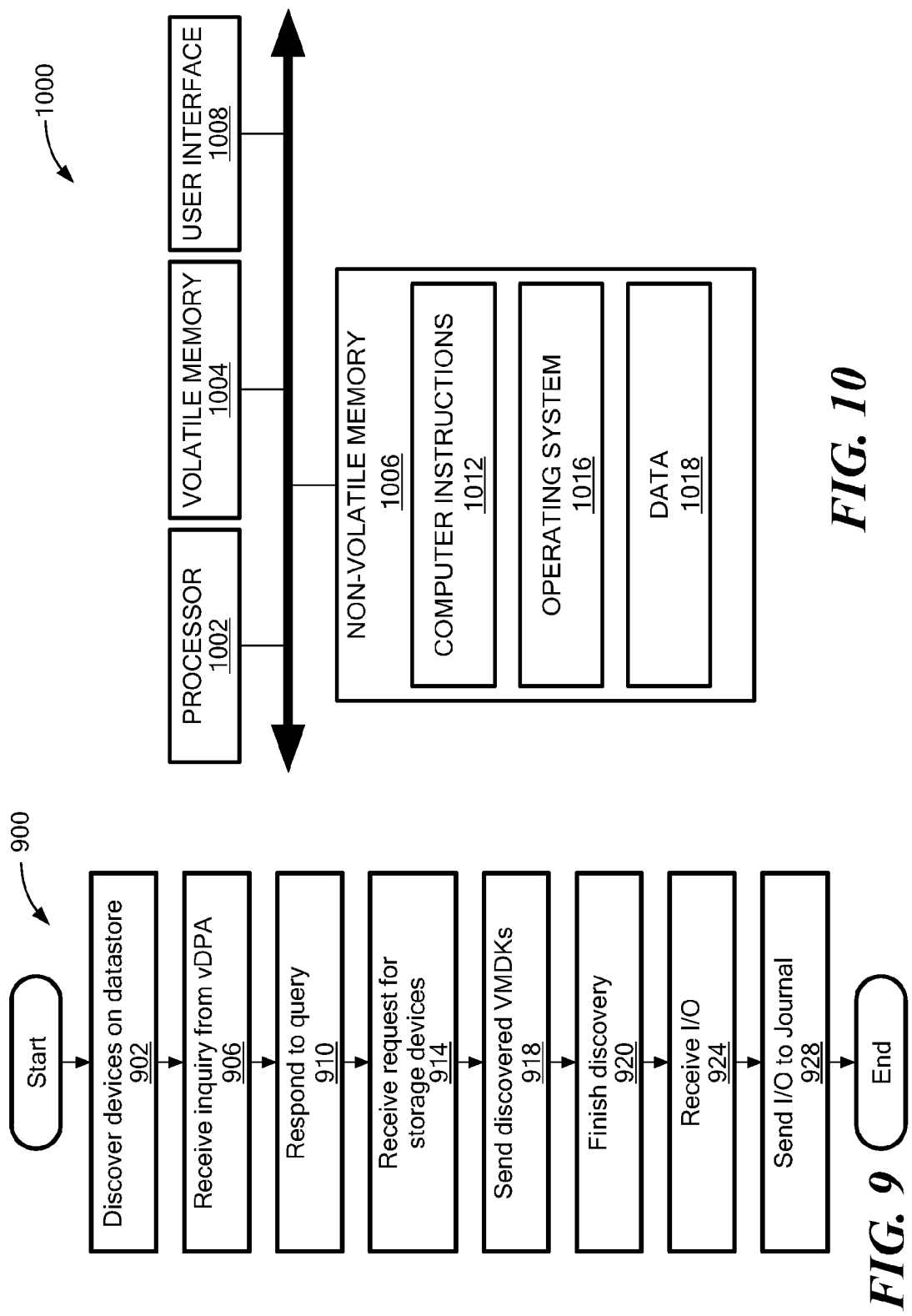

ACCESSING MULTIPLE VIRTUAL DEVICES

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes receiving a first I/O at a kernel interface using a pseudo data storage system, writing the first I/O to a first virtual device on a datastore, receiving a second I/O at the kernel interface using the pseudo data storage system and writing the second I/O to a second virtual device on the datastore.

In another aspect, an apparatus includes electronic hardware circuitry configured to receive a first I/O at a kernel interface using a pseudo data storage system, write the first I/O to a first virtual device on a datastore, receive a second I/O at the kernel interface using the pseudo data storage system and write the second I/O to a second virtual device on the datastore.

In a further aspect, an article includes a non-transitory computer-readable medium that stores computer-executable instructions. The instructions cause a machine to receive a first I/O at a kernel interface using a pseudo data storage system, write the first I/O to a first virtual device on a datastore, receive a second I/O at the kernel interface using the pseudo data storage system and write the second I/O to a second virtual device on the datastore.

BRIEF DESCRIPTION OF THE DRAWINGS

FIG. 9 is a flowchart of an example of a process to access a journal on a virtual device using the pseudo device.

FIG. 10 is a simplified block diagram of an example of a computer on which any of the process of FIGS. 5 to 7 and 9 may be implemented.

DETAILED DESCRIPTION

Figure 1:
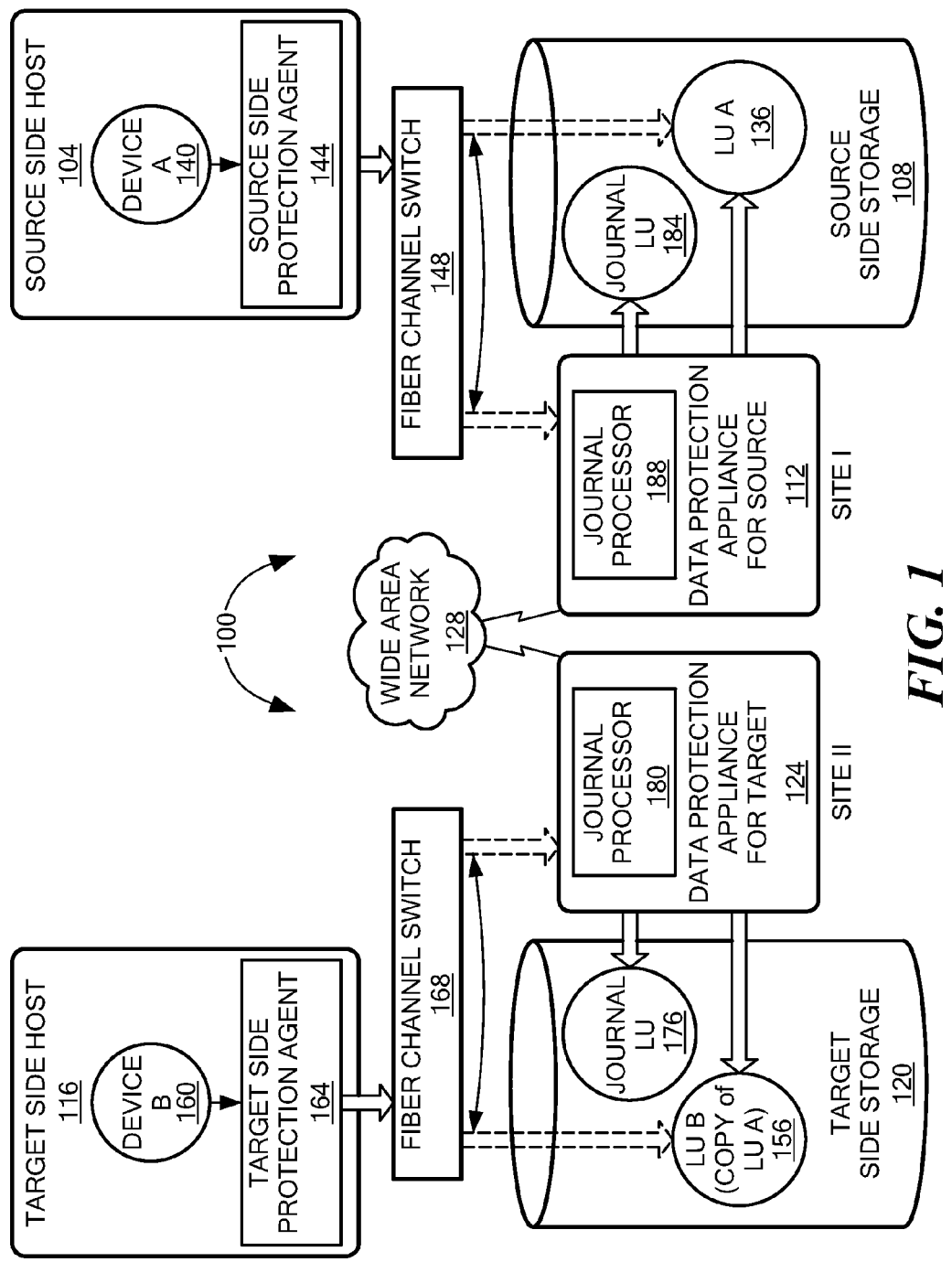
FIG. 1 is a block diagram of an example of a data protection system.

Described herein is a replication system that allows reading and writing of data to multiple virtual disks via a single pseudo data storage system (or a smaller number of pseudo data storage systems). The pseudo data storage system is used to access journals and repository volumes in a virtual environment.

The following definitions may be useful in understanding the specification and claims.

BACKUP SITE—a facility where replicated production site data is stored; the backup site may be located in a remote site or at the same location as the production site;

BOOKMARK—a bookmark is metadata information stored in a replication journal which indicates a point in time.

DATA PROTECTION APPLIANCE (DPA)—a computer or a cluster of computers responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

I/O REQUEST—an input/output request (sometimes referred to as an I/O), which may be a read I/O request (sometimes referred to as a read request or a read) or a write I/O request (sometimes referred to as a write request or a write);

JOURNAL—a record of write transactions issued to a storage system; used to maintain a duplicate storage system, and to roll back the duplicate storage system to a previous point in time;

LOGICAL UNIT—a logical entity provided by a storage system for accessing data from the storage system. The logical disk may be a physical logical unit or a virtual logical unit;

LUN—a logical unit number for identifying a logical unit;

PHYSICAL LOGICAL UNIT—a physical entity, such as a disk or an array of disks, for storing data in storage locations that can be accessed by address;

PRODUCTION SITE—a facility where one or more host computers run data processing applications that write data to a storage system and read data from the storage system;

REMOTE ACKNOWLEDGEMENTS—an acknowledgement from remote DPA to the local DPA that data arrived at the remote DPA (either to the appliance or the journal)

SPLITTER ACKNOWLEDGEMENT—an acknowledgement from a DPA to the protection agent (splitter) that data has been received at the DPA; this may be achieved by an SCSI status command.

SAN—a storage area network of nodes that send and receive an I/O and other requests, each node in the network being an initiator or a target, or both an initiator and a target;

SOURCE SIDE—a transmitter of data within a data replication workflow, during normal operation a production site is the source side; and during data recovery a backup site is the source side, sometimes called a primary side;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side, sometimes called a secondary side;

THIN PROVISIONING—thin provisioning involves the allocation of physical storage when it is needed rather than allocating the entire physical storage in the beginning. Thus, use of thin provisioning is known to improve storage utilization.

THIN LOGICAL UNIT—a thin logical unit is a logical unit that uses thin provisioning;

VIRTUAL LOGICAL UNIT—a virtual storage entity which is treated as a logical unit by virtual machines;

WAN—a wide area network that connects local networks and enables them to communicate with one another, such as the Internet.

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

Referring to FIG. 1, a data protection system 100 includes two sites; Site I, which is a production site, and Site II, which is a backup site or replica site. Under normal operation the production site is the source side of system 100, and the backup site is the target side of the system. The backup site is responsible for replicating production site data. Additionally, the backup site enables roll back of Site I data to an earlier pointing time, which may be used in the event of data corruption of a disaster, or alternatively in order to view or to access data from an earlier point in time.

FIG. 1 is an overview of a system for data replication of either physical or virtual logical units. Thus, one of ordinary skill in the art would appreciate that in a virtual environment a hypervisor, in one example, would consume logical units and generate a distributed file system on them such as VMFS creates files in the file system and expose the files as logical units to the virtual machines (each VMDK (Virtual Machine Disk) is seen as a SCSI device by virtual hosts). In another example, the hypervisor consumes a network based file system and exposes files in the NFS as SCSI devices to virtual hosts.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks may be used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (sometimes referred to as a splitter) may run on the host, or on the storage, or in the network or at a hypervisor level, and that DPAs are optional and DPA code may run on the storage array too, or the DPA 124 may run as a virtual machine.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. The logical unit may be a physical logical unit or a virtual logical unit. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one embodiment, LU B is configured so that its size is identical to the size of LU A. Thus, for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface.

Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system or on the storage system itself. In a virtualized environment, the protection agent may run at the hypervisor layer or in a virtual machine providing a virtualization layer.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI I/O write requests. A replicated SCSI I/O write request is sent to DPA 112. After receiving an acknowledgement from DPA 124, protection agent 144 then sends the SCSI I/O write request to LU A. After receiving a second acknowledgement from storage system 108 host computer 104 acknowledges that an I/O command complete.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B. updates the journal entries in the journal LU with undo information, applies the journal transactions to LU B, and removes already-applied transactions from the journal.

Figure 2:
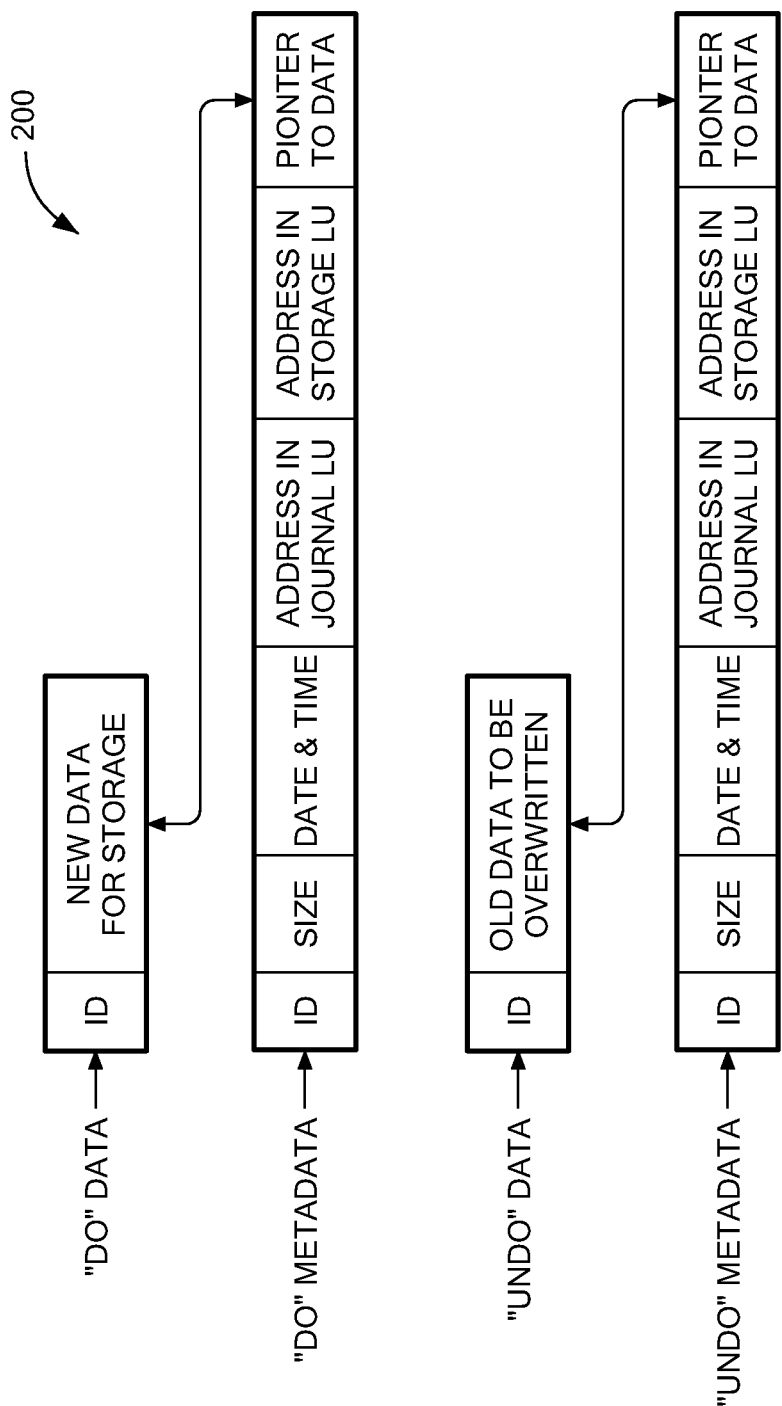
FIG. 2 is an illustration of an example of a journal history of write transactions for a storage system.

Referring to FIG. 2, which is an illustration of a write transaction 200 for a journal. The journal may be used to provide an adaptor for access to storage 120 at the state it was in at any specified point in time. Since the journal contains the "undo" information necessary to roll back storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in the journal that includes four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the DO stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the UNDO stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream. In some examples, the metadata stream (e.g., UNDO METADATA stream or the DO METADATA stream) and the data stream (e.g., UNDO stream or DO stream) may be kept in a single stream each (i.e., one UNDO data and UNDO METADATA stream and one DO data and DO METADATA stream) by interleaving the metadata into the data stream.

Figure 3:
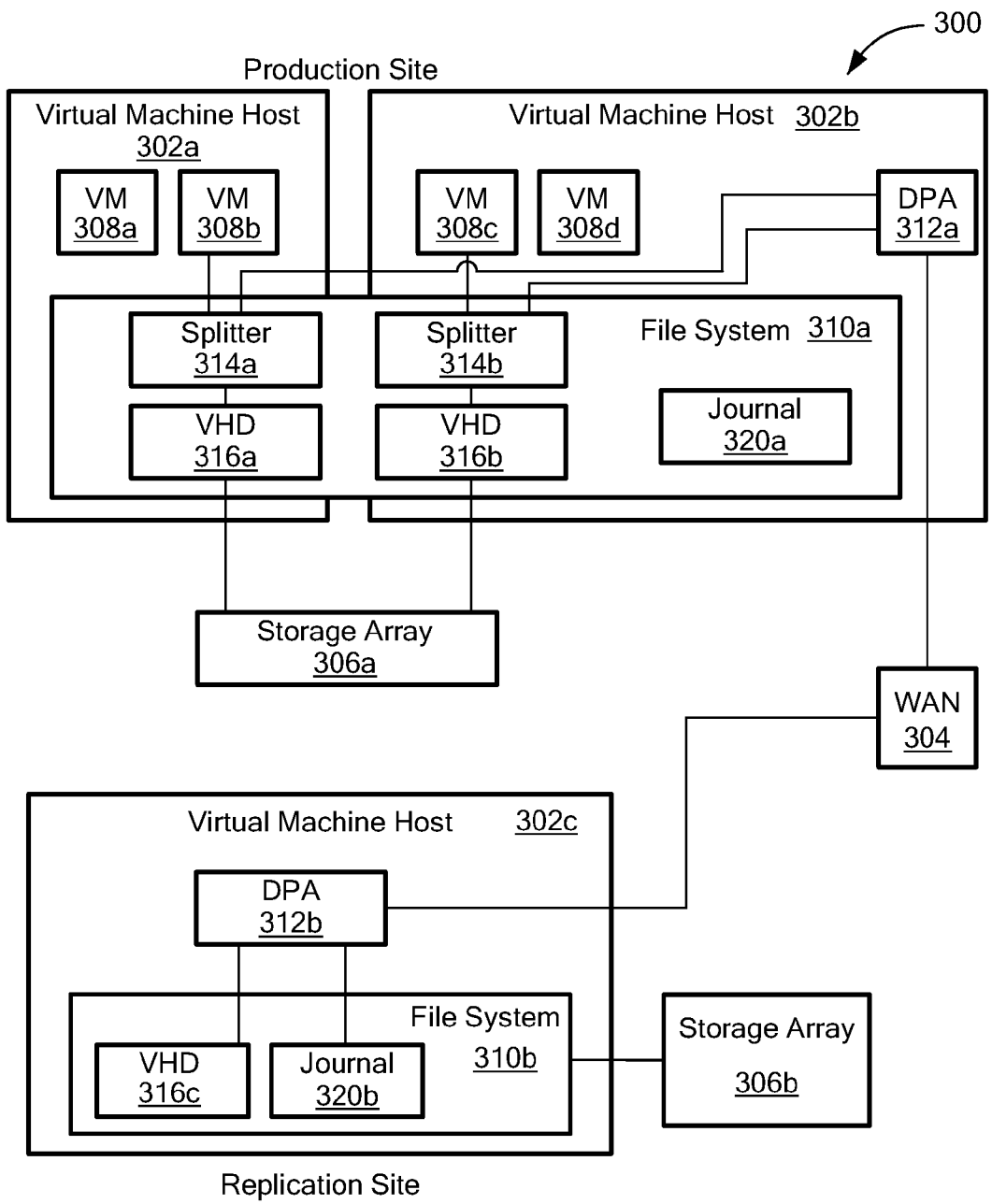
FIG. 3 is a block diagram of an example of the data protection system used in a virtual environment.

Referring to FIG. 3, an example of the data protection system used in a virtual environment is a data protection system 300. The system 300 includes virtual machine hosts (hypervisors) (e.g., a virtual machine hosts (hypervisors) 302a-302c), storage arrays (a storage array 306a, 306b) and a wide area network (WAN) 304. The virtual machine hosts (hypervisors) 302a, 302b and the storage array 306a are on the productions site and the virtual machine hosts (hypervisors) 302c and the storage array 306b are on the replication site. In one example, the virtual machine monitors 302a-302c is a MICROSOFT® HYPER-V®. In another example, the virtual machine monitors 302a-302c is a VMWARE® virtualization.

The virtual machine monitor 302a includes virtual machines (e.g., virtual machines 308a, 308b), a splitter 314a and virtual machine hard drive (VHD) (e.g., VHD 316a) and the virtual machine hosts (hypervisors) 302b includes a virtual data protection appliance (DPA) 312a, virtual machines (e.g., virtual machines 308c, 308d), a splitter 314a, VHDs (e.g., VHD 316b) and a journal virtual disk 320a. The VHDs 316a, 316b and the journal 320a are part of a file system 310a. The splitters 314a, 314b intercept I/Os arriving to the virtual hard drives, VHDs 316a, 316b, respectively. In one example, the file system 310a is a clustered shared volume file system (Microsoft® CSVFS) or a VMWARE® file system (VMFS). In another example the virtual disks are VMWARE® VVOLS or virtual volumes.

The virtual machine host (hypervisor) 302c includes a data protection appliance 312a, a splitter 314a, a virtual disk 316c and a journal 320b. The VHD 316c and the journal 320b are part of a file system 310b. In one example, the file system 310a is a CSVFS or a VMFS. In one example, the journals 320a, 320b are each VHDs.

In one example, an I/O from a VM 308a that is directed to a virtual disk 316a is split by the splitter 314a to the DPA 312b (via the DPA 312a and the WAN 304) recorded by the journal 320b to be stored on the virtual disk 316c.

Figure 4A:
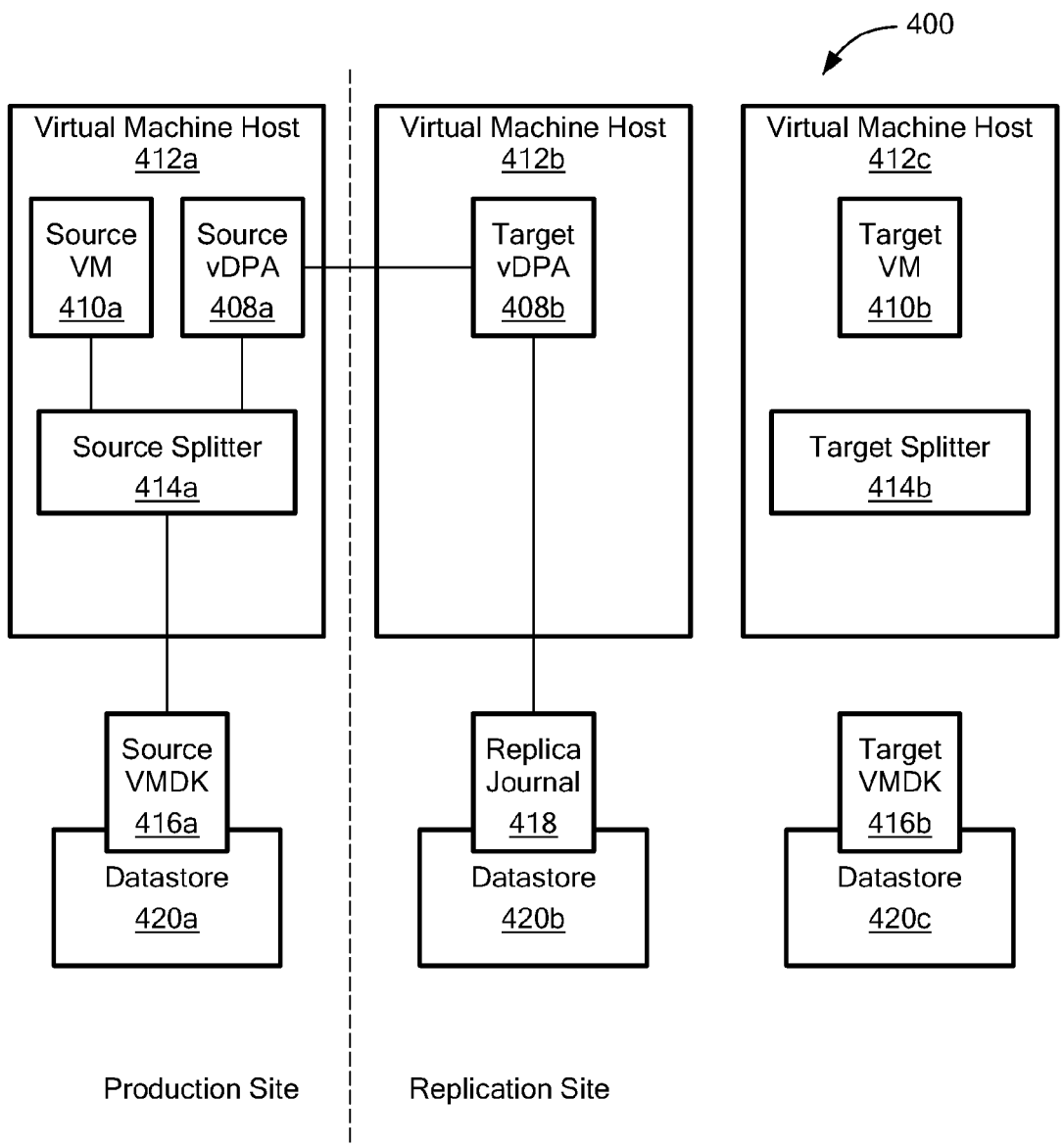
FIG. 4A is a simplified block diagram of an example of a data replication system in a virtual environment with splitters at a kernel.

Referring to FIG. 4A, a replication system 400 includes splitters at a kernel. In particular, the replication system 400 includes virtual machine hosts 412a-412c and datastores 420a-420c. The virtual machine host 412a includes a source virtual data protection appliance (vDPA) 408a, a source virtual machine (VM) 410a, a source splitter 414a at a kernel. The virtual machine host 412b includes a target vDPA 408b. The virtual machine host 412c includes a target splitter 414b at a kernel and a target VM 410b. The datastore 420a includes a source VMDK 416a, the datastore 420b includes a replica journal 418 and the datastore 420c includes a target VMDK 416c.

The source splitter 414a sends I/Os from the source VM 410a to the source VMDK 416a and to the source vDPA 408a, which send the I/Os to target vDPA 408b to be recorded in the replica journal 418 (similar to the processes described for FIGS. 1 and 2).

In one example, the vDPA 408a can perform a production read using the source splitter 414a. The source splitter 414a can poll the vDPA 408a, receive metadata of I/Os, read from the source VMDK 416a and write to the vDPA 408a However, the vDPA 408b is unable to access efficiently the target VMDK 416b. In particular, there is no interface to the target VMDK 416b that provides efficient and scalable access to the target VMDK 416b. For example, VMDKs can be accessed efficiently only if VMs use them (i.e., the target VMDK cannot be accessed efficiently if there is no VM attached to it and opening the disk) and a VM can only have up to 60 VMDKs attached to it.

If a VM with VMDK 416b is powered up, the kernel splitter 414b is able to access the VMDK 416b as an I/O stack is generated when a process (e.g., a user process) opens the target VMDK 416b. To facilitate this the replication system 400 maintains a powered-up target VM 410b with the target VMDK 416b attached to it. Using the target VM 410b generates a resource issue as the VMs may be allocated multiple virtual cores, memory reservations and other resources, and also if VM is completely powered up the application in the VM may generate I/Os of its own changing the underlying VMDK 416b which is not desired.

Figure 4B:
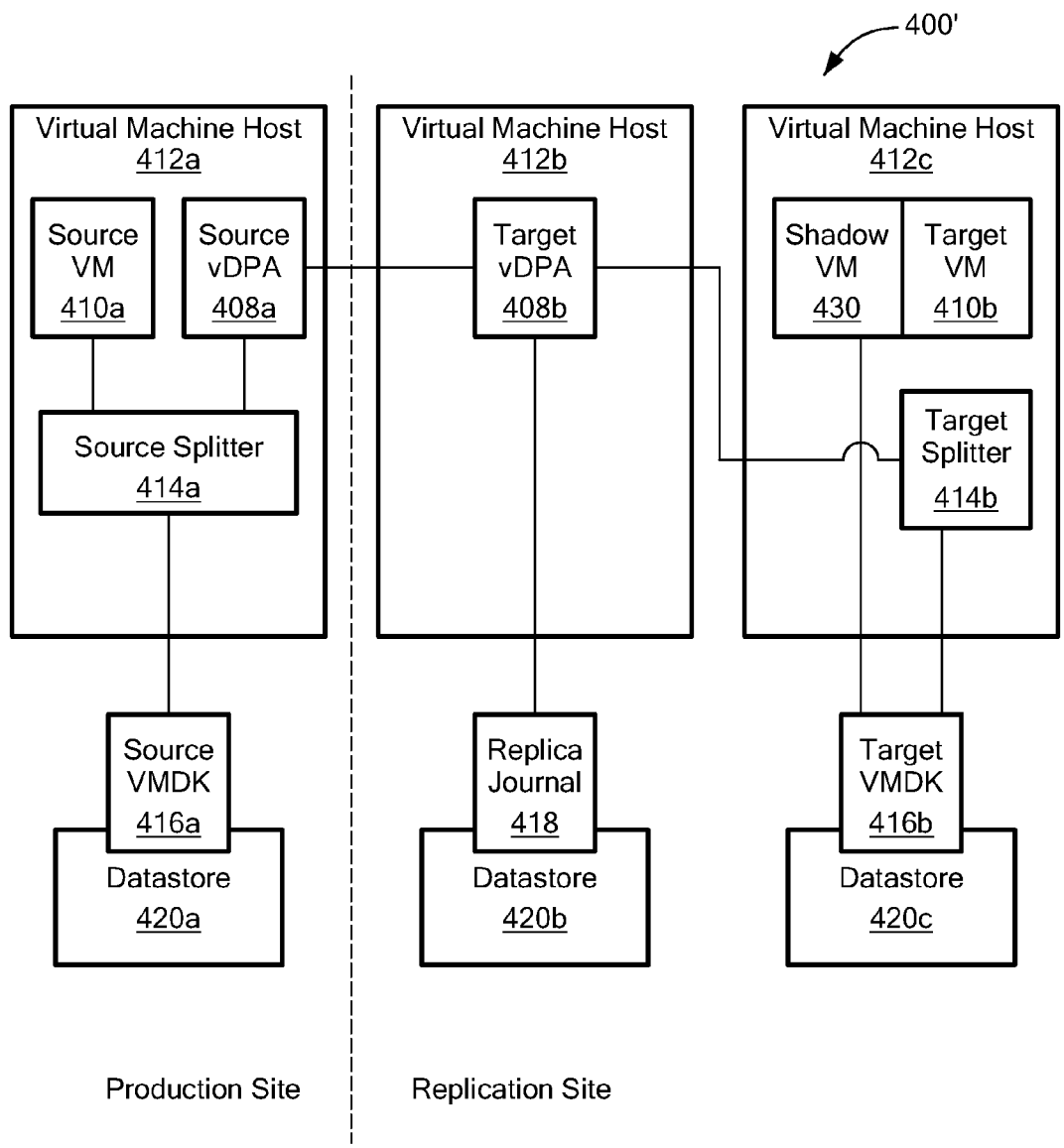
FIG. 4B is a simplified block diagram of an example of a data replication system of FIG. 4A that includes a shadow virtual machine.

Referring to FIG. 4B, a replication system 400' is the same as the replication system 400 except the replication system 400' includes a shadow VM 430. The shadow VM is a shadow configuration of the target VM 410b, which includes all the virtual disks of the virtual machine, with minimal CPU and memory configuration (e.g., 1 virtual central processing unit (CPU) with no CPU reservation and 64 MB or 256 MB of memory). The shadow VM 430 is configured to have the same ID as the target VM 410b to make it transparent to virtual system management. The shadow VM 430 is also configured to load only up to a BIOS (basic input/output system) state only (i.e., the BIOS is the only process that is being performed), so that the target VMDK 416b will be loaded to the kernel I/O stack but not accessed by the VM process, which conserves even less resources and also avoids alerts reported by the shadow VM 430 to management that it is unable to access its VMDK. For example, any VM that is powered up has OS running which accesses the internal disks and may change them, running the VM in BIOS mode only assures the no OS runs in the VM and the disks are not changed except from changes made by the splitter.

The shadow VM enables access to a target VMDK by multiple vDPAs without the target virtual machines fully running. This allows significantly higher (up to two orders of magnitude) performance than other tools while still keeping the consumption of virtual resources minimal. The access to the virtual disks of the shadow VM from the vDPA is done using a communications protocol. In order to write to the device the vDPA sends the data to the splitter which writes the I/Os to the VMDK. To read I/Os the vDPA sends a read request to the splitter. The splitter reads from the device and sends the response back to the vDPA.

Figure 5:
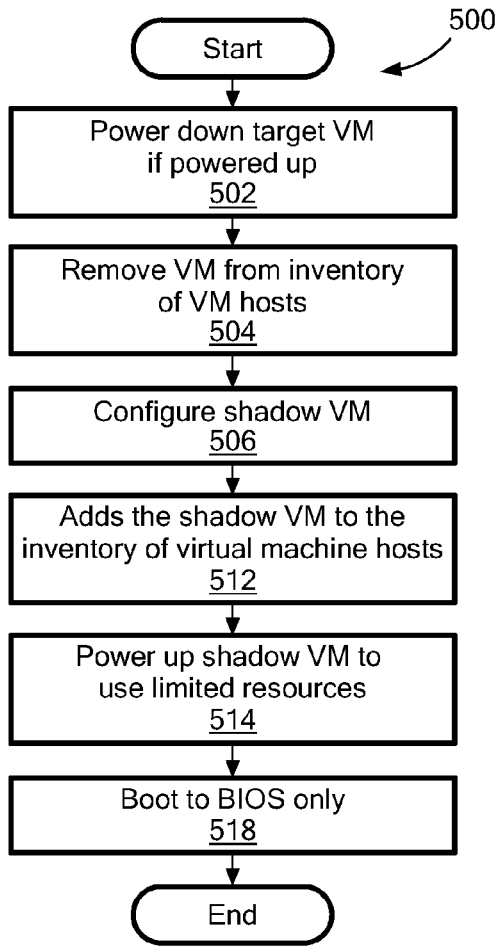
FIG. 5 is a flowchart of an example of a process to generate a shadow virtual machine.

Referring to FIG. 5, a process 500 is an example of a process to generate a shadow virtual machine (e.g., shadow VM 430). Process 500 powers down a target VM 410b if powered up already (502). In some examples, the target VM 410b may be powered up during a disaster recover test.

Process 500 removes VM 412b from the inventory of the virtual machine hosts (504).

Process 500 configures shadow VM 430 (506), for example, by assigning an ID to the shadow VM 430 to be the same as the target VM 410b and by attaching the same VMDKs (e.g., target VMDK 416b) of the target VM 410b to the shadow VM 430. Process 500 adds the shadow VM 430 to the inventory of the virtual machine hosts (512).

Process 500 powers up the shadow VM 430 to use limited resources (e.g., limited memory and CPU requirements) (514) and boots to the BIOS only (518) so that the VMDK will be loaded to the I/O stack but not accessed by the VM itself (i.e., the VM does not boot so the disk is accessible but the VM itself does not access it). Powering up the shadow VM 430 allows access to the target VMDK 416b, by the splitter.

Figure 6:
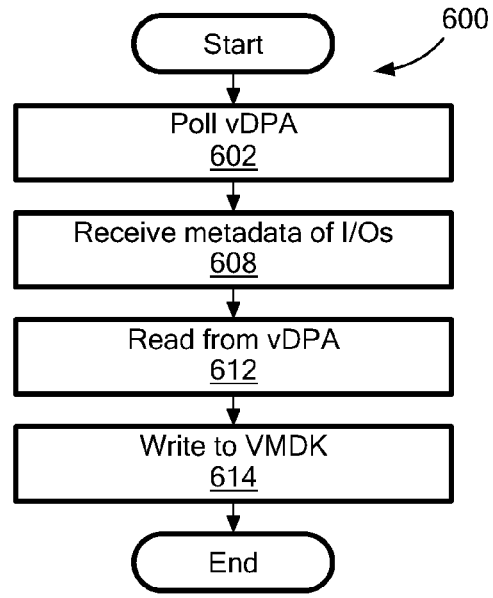
FIG. 6 is a flowchart of an example of a process to perform a target side write.

Referring to FIG. 6, a process 600 is an example of a process to write to the target VMDK 416b after the target VMDK 416b has been made accessible by the shadow VM 430. In one example, the process 600 is performed by the target splitter 414b.

Process 600 polls the vDPA 408b by issuing a read commands from splitter 414b to vDPA 408b (602) and receives metadata of the I/Os to replicate (608). Process 600 reads from the vDPA 408b I/Os to be written (612) and writes the I/Os to the target VMDK 410b (614).

Figure 7:
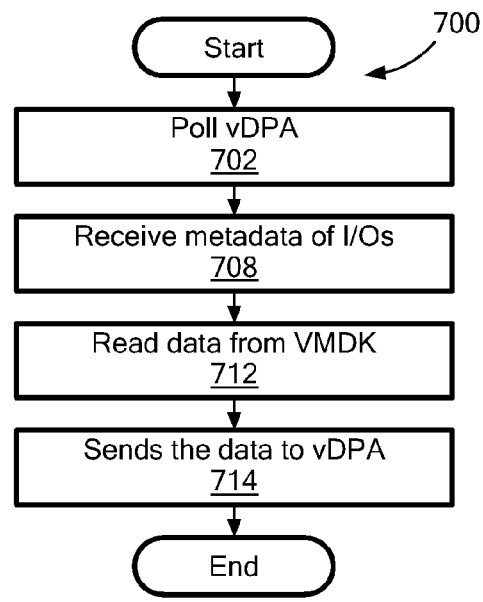
FIG. 7 is a flowchart of an example of a process to perform a target side read.

Referring to FIG. 7, a process 700 is an example of a process to read from the target VMDK 416b after the target VMDK 416b has been made accessible by the shadow VM 430. Process 700 polls the vDPA 408b by issuing one or more read commands from the splitter 414b to the vDPA 408b (702) and receives metadata of the I/Os to replicate (708). Process 700 has splitter 414b reads data corresponding to the I/Os from the VMDK 416b (712) and sends the data to the vDPA 408b (714).

Figure 8:
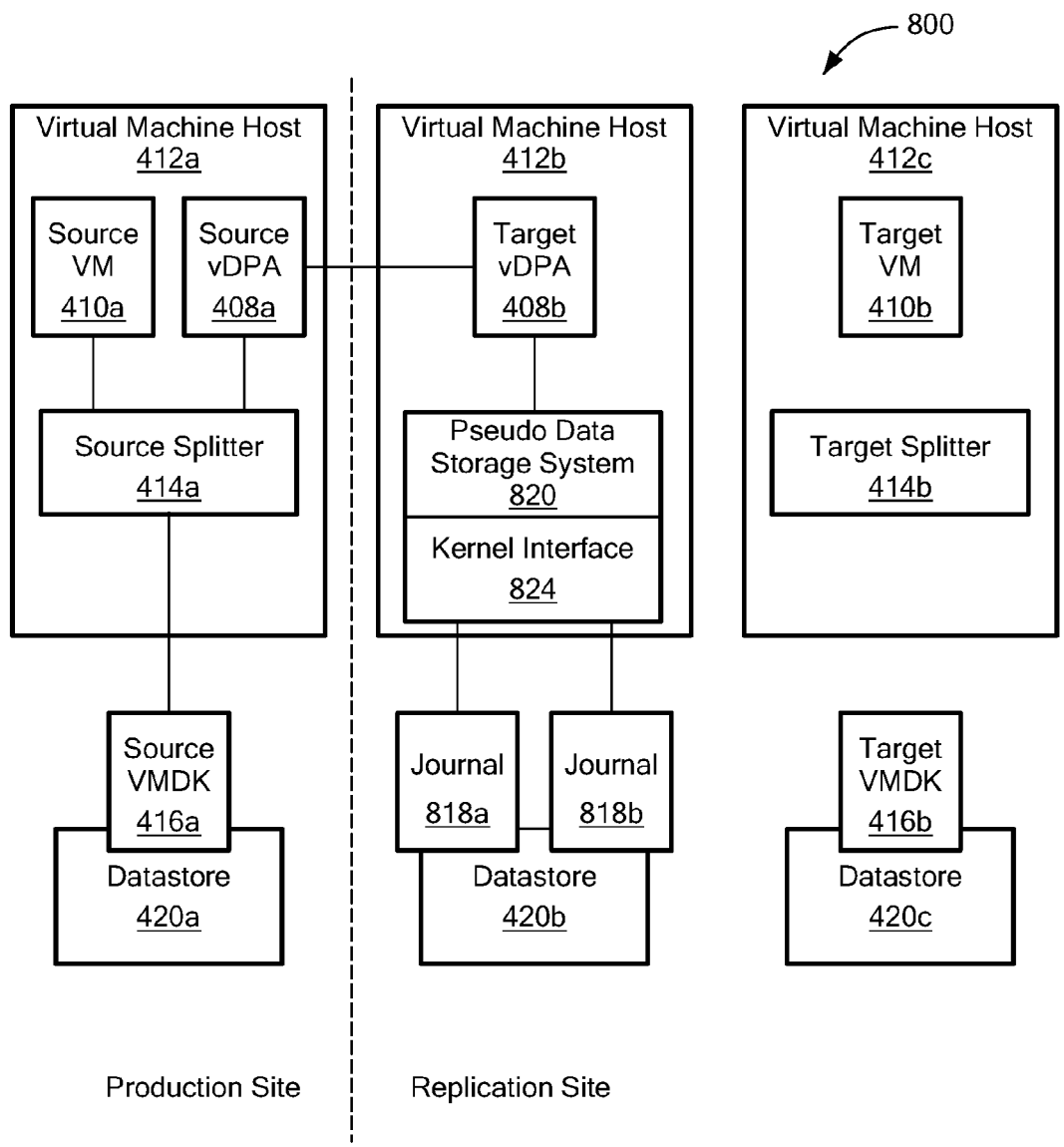
FIG. 8 is a simplified block diagram of an example of a data replication system of FIG. 4A that includes a pseudo device.

Referring to FIG. 8, one of the main limitations with virtual machines is that a virtual machine can only access a limited number of virtual devices (e.g., 60 VMDKs). In many cases the vDPA needs to access more than 60 journal devices. FIG. 8 describes a method to allow access to any number of journal devices.

A replication system 800 is the same as the replication system 400 except the replication system 800 includes a pseudo data storage system 820 and a kernel interface 824, both disposed at the virtual machine host 412b, that allow access to multiple replica journals (e.g., a replica journal 818a, a replica journal 818b), which are VMDKs. The pseudo data storage system 820 acts as a dummy VMDK. That is, the vRPA does not see the replica journals 818a, 818 but just the pseudo data storage system 820 i.e., there is a VMDK attached to virtual DPA as a disk and all interactions to the journals are done by sending I/Os to the pseudo data storage system 820. Interactions with the vDPA 408b are handled by the pseudo data storage system 820. In one example, the kernel interface 824 is a splitter in a kernel.

In one example, the pseudo data storage system 820 is attached to the vDPA 408*b* and is configured so that the kernel interface 824 will trap I/O received form the vDPA 408*b* to the pseudo data storage system 820. The pseudo data storage system 820 will then act as a communication channel between the vDPA and the kernel. The kernel interface 824 can trap and respond to SCSI commands sent by the vRPA 408*b*. The kernel interface 824 responds in a way that simulates a virtual storage system in the kernel. Therefore, in one particular example, the system (e.g., Linux) that the vRPA 408*b* runs sees the single attached virtual device as a port connected to a complete storage system that can access multiple devices.

Referring to FIG. 9, a process 900 is an example of a process to access multiple replica journals. In one example, the process 900 is performed by the kernel interface 824. Process 900 discovers devices on a datastore (902). For example, the kernel interface 824 discovers the replica journals 818*a*, 818*b* (e.g., VMDKs) by scanning the datastore 420*b*.

Process 900 receives an inquiry from the vDPA (906) and responds to the query (910). For example, the inquiry (e.g., a discovery) is received by the pseudo data storage system 820 to determine what the pseudo device is. The kernel interface 824 responds back to the vDPA 408*b* using the pseudo data storage system 820. The response back notifies the vDPA 408*b* that the pseudo data storage system 820 is a storage system though this is not true.

Process 900 receives a request from the vDPA 408*b* for storage devices that are on the pseudo data storage system 820 (914). For example, the vDPA 408*b*, being fooled in to determining that the pseudo data storage system 820 is actually a storage system, requests information on the storage devices on the pseudo data storage system 820.

Process 900 sends the discovered VMDKs (e.g., as determined in processing block 902) (918). For example, name, IDs and size of the VMDKs are returned.

Process 900 finishes discovery 920. In some examples, discovery of the VMDKs can be done by scanning the datastore (as described herein); using a naming convention for the VMDKs; using a directory structure and placing the VMDKs in specific directories (with or without a naming convention) and/or placing or communicating a table with the VMDK locations on the datastore. In some examples, completing the discovery process after the list of VMDKs is established includes (for each device) one or more of the follow: using a READ_CAPACITY command to get the device size. Using a STD_INQ command for general device information, using an INQUIRY command (e.g., pg 83) to get the device ID, using an INQUIRY command to other pages to get compatibility for features and extended command, thin/thick allocation and so forth; getting device geometry; and/or using other per device commands.

Process 900 receives an I/O (924) and send the I/O to the journal (928). For example, the I/O is sent from vDPA to the pseudo data storage system 820 and the kernel interface writes the I/O to the respective replica journal (e.g., replica journal 818*a* or replica journal 818*b*). For example, in the vDPA I/O stack located in the vDPA kernel there is code to trap commands to the pseudo data storage system 820 and to add LUN designation information to SCSI commands sent by the vDPA. This information is read by the kernel interface 824 (in virtual host kernel) and then stripped before the command is forwarded to the target LUN (replica journal). In one particular example, the information that is added is by using unutilized CDB (SCSI command description block—the meta data in the SCSI command) fields/bits to place the LUN number or adding an additional data block to the command scatter gather list for the information to be placed (each SCSI command has a scatter gather list containing the payload of the SCSI command, one option of sending the data includes increasing the SCSI command size (i.e. a SCSI command has a size of the payload in blocks we increase it by 1 and add one more block to the scatter gather list, the extra block includes the device of journal to be written to and the offset, then stripping the extra block and sending the data to the journal).

Referring to FIG. 10, in one example, a computer 1000 includes a processor 1002, a volatile memory 1004, a non-volatile memory 1006 (e.g., hard disk) and the user interface (UI) 1008 (e.g., a graphical user interface, a mouse, a keyboard, a display, touch screen and so forth). The non-volatile memory 1006 stores computer instructions 1012, an operating system 1016 and data 1018. In one example, the computer instructions 1012 are executed by the processor 1002 out of volatile memory 1004 to perform all or part of the processes described herein (e.g., processes 500, 600, 700 and 800).

The processes described herein (e.g., processes 500, 600, 700 and 900) are not limited to use with the hardware and software of FIG. 10; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 500, 600, 700 and 900 are not limited to the specific processing order of FIGS. 5 to 7 and 9, respectively. Rather, any of the processing blocks of FIGS. 5 to 7 and 9 may be re-ordered, combined or removed, performed in parallel or in serial, as necessary, to achieve the results set forth above.

The processing blocks (for example, in the processes 500, 600, 700 and 900) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method comprising:
    discovering devices on a data store comprising a first virtual device and a second virtual device;
    receiving an inquiry from a virtual data protection appliance;
    responding to the query by providing information on a pseudo data storage system;
    sending discovered devices to the virtual data protection appliance;
    receiving a first input/output (I/O) request at a kernel interface using the pseudo data storage system;
    writing the first I/O request to a first journal, used in a data replication process, in a first virtual device on the datastore;
    receiving a second I/O request at the kernel interface using the pseudo data storage system; and
    writing the second I/O request to a second virtual device on the datastore, wherein the second storage device is separate from the first storage device.

2. The method of claim 1, further comprising attaching the pseudo data storage system to a virtual data protection appliance.

3. The method of claim 1, wherein receiving a first I/O request at a kernel interface using the pseudo data storage system comprises: intercepting a command to the pseudo data storage system; and stripping designation information from the command before the command is forwarded to the pseudo data storage system.

4. An apparatus, comprising:
    electronic hardware circuitry configured to:
        discover devices on a data store comprising a first virtual device and a second virtual device;
        receive an inquiry from a virtual data protection appliance;
        respond to the query by providing information on a pseudo data storage system;
        send discovered devices to the virtual data protection appliance;
        receive a first input/output (I/O) request at a kernel interface using the pseudo data storage system;
        write the first I/O request to a first journal, used in a data replication process, in a first virtual device on the datastore;
        receive a second I/O request at the kernel interface using the pseudo data storage system; and
        write the second I/O request to a second virtual device on the datastore, wherein the second storage device is separate from the first storage device.

5. The apparatus of claim 4, wherein the electronic hardware circuitry comprises at least one of a processor, a memory, a programmable logic device or a logic gate.

6. The apparatus of claim 4, further comprising circuitry to attach the pseudo data storage device to a virtual data protection appliance.

7. The apparatus of claim 4, wherein the circuitry to receive a first I/O at a kernel interface using a pseudo data storage system comprises circuitry to:
    intercept a command to the pseudo data storage system; and
    strip designation information from the command before the command is forwarded to the pseudo data storage system.

8. An article comprising:
    a non-transitory computer-readable medium that stores computer-executable instructions, the instructions causing a machine to:
        discover devices on a data store comprising a first virtual device and a second virtual device;
        receive an inquiry from a virtual data protection appliance;
        respond to the query by providing information on a pseudo data storage system;
        send discovered devices to the virtual data protection appliance;
        receive a first input/output (I/O) request at a kernel interface using the pseudo data storage system;
        write the first I/O request to a first journal, used in a data replication process, in a first virtual device on the datastore;
        receive a second I/O request at the kernel interface using the pseudo data storage system; and
        write the second I/O request to a second virtual device on the datastore, wherein the second storage device is separate from the first storage device.

9. The article of claim 8, further comprising instructions causing the machine to attach the pseudo data storage device to a virtual data protection appliance.

10. The article of claim 8, wherein the instructions causing the machine to receive a first I/O at a kernel interface using a pseudo data storage system comprises instructions causing the machine to:
    intercept a command to the pseudo data storage system; and
    strip designation information from the command before the command is forwarded to the pseudo data storage system.

* * * * *